United States Patent [19]
Cotterill

[11] Patent Number: 5,504,716
[45] Date of Patent: Apr. 2, 1996

[54] PASSIVE SONAR TRANSDUCER ARRANGEMENT

[75] Inventor: Philip A. Cotterill, Wilmslow, England

[73] Assignee: Ferranti-Thomson Sonar Systems U.K. Limited, Cheshire, England

[21] Appl. No.: 400,947

[22] Filed: Mar. 9, 1995

[30] Foreign Application Priority Data

Mar. 16, 1994 [GB] United Kingdom .................. 9405103

[51] Int. Cl.⁶ ........................................... G01S 3/20
[52] U.S. Cl. ................................................. 367/121
[58] Field of Search ..................... 367/118–125

[56] References Cited

U.S. PATENT DOCUMENTS 4,458,533 7/1984 Borburgh ................................ 367/105
4,509,151 4/1985 Anderson ............................... 367/122

*Primary Examiner*—Daniel T. Pihulic
*Attorney, Agent, or Firm*—Larson and Taylor

[57] ABSTRACT

A passive sonar transducer arrangement includes two steerable array sections (10,11) arranged with the transducers of one section (10) spaced apart from one another by a different distance (d1) from the spacing (d2) between the transducers of the other section (11), the spacing for each section being such that aliasing will occur for at least some steering angles ($\Theta_s$) and such that the alias beams produced by the two sections of the array will not overlap. Cross-correlation means (12–19) are provided to process the signals received from the sonar transducers of the two sections such that the effects of the alias beams are substantially removed.

2 Claims, 1 Drawing Sheet

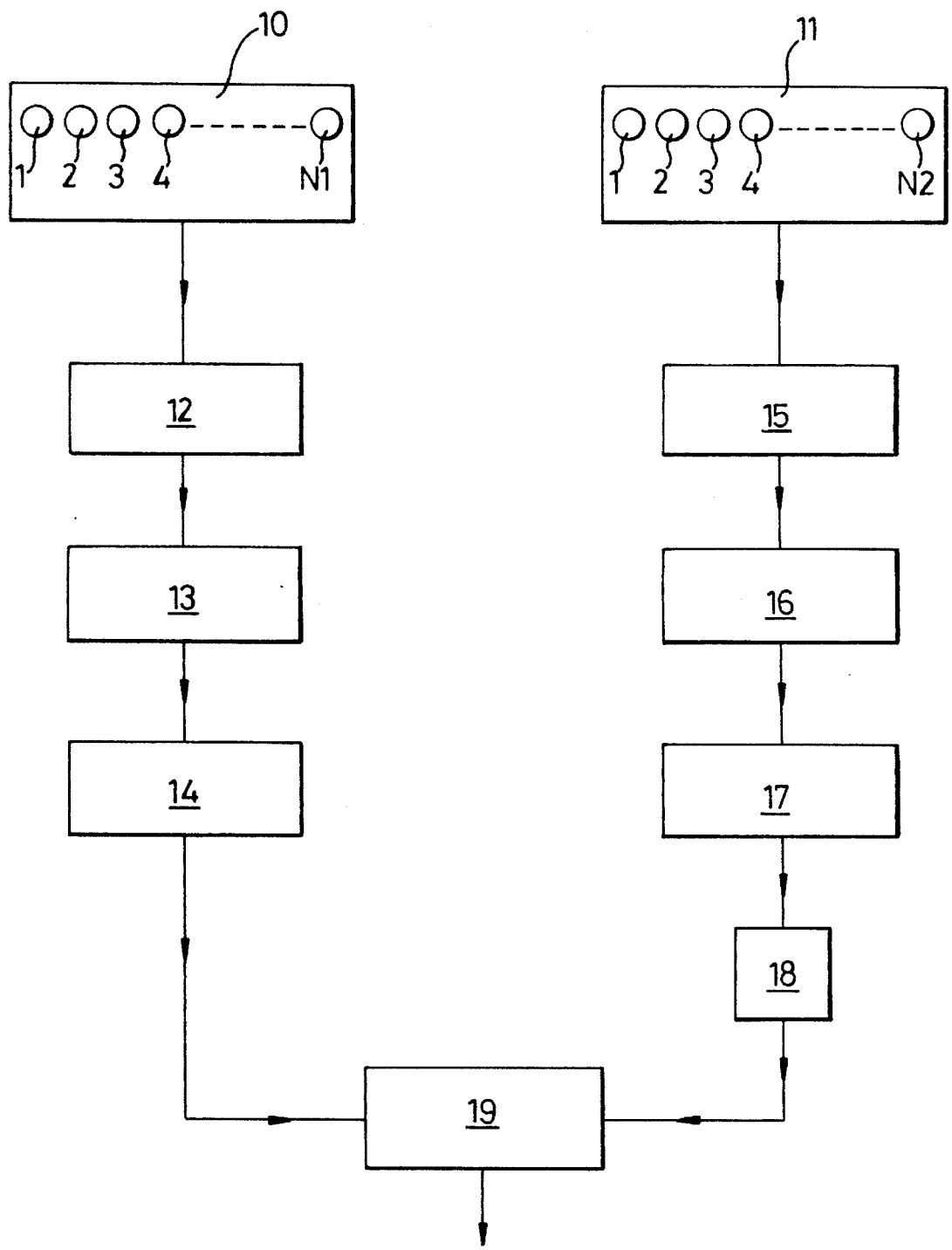

1

PASSIVE SONAR TRANSDUCER ARRANGEMENT

This invention relates to passive sonar transducer arrangements and is concerned with both the construction of an array of transducers and the processing of signals from the array.

Passive sonar transducer arrays are used to receive acoustic signals usually, though not exclusively, in underwater environments. The arrays may be static or mobile, and the latter may be attached to or towed by seaborne or airborne vehicles. A towed array may comprise a large number of sonar transducers arranged in a line. For effective signal processing, electrical connections have to be taken from each individual transducer to the signalprocessing equipment, which is usually located on the towing vehicle. This means that the number of individual electrical connections to be passed through the array assembly has to be proportional to the number of transducers used in the array. This imposes limitations on the design of the array, as space and weight allowances have to be made for these electrical connections. This problem also occurs with large area hull-mounted arrays. It is known to use multiplexing techniques to reduce the number of electrical connections which have to be brought out of the array. However, this is costly. The number of transducers used in array also affects the cost of the inboard signal processing equipment.

Transducer arrays are often used in pairs, or a single array is divided into two sections, to allow for a signal processing technique known as "cross-correlation" to be used. This is a well-known technique in the sonar field, used in particular for the reduction of noise which might affect one section of an array and not the other. The electrical outputs of the individual hydrophones are processed electronically to form "beams", with the direction of maximum response directed in a particular direction, in which the array is said to be "steered". Usually the steering angle is variable. The range of steering angle imposes limitations on the number of transducers which have to be used in each section of the array, in that there is a minimum value to the physical spacing between the individual transducers if a problem known as "aliasing" is to be avoided. In addition, the length of an array is determined, at least in part, by the required beamwidth and the frequency of operation of the array, a lower frequency of operation requiring a longer array. Hence the problem of separate electrical connections from each transducer cannot be overcome simply by reducing the number of transducers or by increasing the spacing between the transducers.

It is an object of the present invention to provide a passive sonar transducer arrangement such that the number of sonar transducers required in any particular situation may be reduced. This makes it possible to reduce the number of electrical connections required to be brought out of the array to the signal processing circuitry.

According to the present invention there is provided a passive sonar transducer arrangement which includes two steerable array sections arranged with the transducers of one section spaced apart from one another by a different distance from the spacing between the transducers of the other section, the spacing for each section being such that aliasing will occur for at least some steering angles and such that the alias beams produced by the two sections of the array will not overlap, and cross-correlation means operable to process the signals received from the sonar transducers of the two sections such that the effects of the alias beams are substantially removed.

The invention will now be described, by way of example, with reference to the accompanying drawings, which is a schematic diagram of an array and its associated cross-correlation circuitry.

In known passive sonar transducer arrays, the spacing d between adjacent transducers in the array is given by the expression $$d < \lambda/(1+\sin\Theta_s)$$

where $\lambda$ is the minimum wavelength of the sonic energy to which the array will respond and $\Theta_s$ is the "steering angle", that is the angle between the sound source and the normal to the plane of the array. This spacing ensures that alias beams are not produced within the acoustic energy region of the transducer assembly. The two sections of an array, or the two arrays, used with cross-correlation circuitry have equal numbers of transducers arranged at equal spacing. If alias beams were produced by the two sections of the array, say by exceeding the steering angle limit, then these alias beams will be equally spaced from the main beam of each section and the cross-correlation process will enhance the alias beams, causing problems. It is for this reason that care must be taken not to exceed the limits of steering angle imposed by the frequency at which the assembly is operated.

A sonar transducer arrangement according to the invention makes use of the fact that, so long as the alias beams produced by the two sections of an array do not overlap, that is they do not occur at the same steering angle within the acoustic region of the array, then the cross-correlation technique will in essence treat the alias beams as uncorrelated noise and remove them. It is inherent in the invention, therefore, that alias beams will occur at some or all steering angle of the array, since if alias beams are not present the resulting situation is the same as if arrays with equal spacing and not exceeding the spacing limit defined above had been used. However, the main benefit of using the technique of the invention is that the number of transducers used in an array may be reduced and this in turn reduces the number of electrical connections to be brought out of the array to the on-board circuitry, as well as reducing the cost due to the smaller number of transducers required.

The drawing shows, in schematic form, a passive sonar transducer array comprising two sections 10 and 11. The first section 10 consists of N1 transducers, spaced apart from one another by a distance d1. The other section, 11, consists of N2 transducers, spaced apart from one another by a distance d2. Each transducer of section 10 is connected to a separate weighting network, the network for the section being shown at 12. Each transducer is weighted in a known manner commonly used with steerable transducer arrays. In addition, a separate time delay is applied to the signal from each separate transducer of the section by a time delay network 13. The time delay is used for steering the section, again in the manner commonly used with steerable arrays. The outputs of the separate transducers are then added in an adder 14. Section 11 of the transducer array is similarly connected through weighting network 15 and time delay network 16 to an adder 17. An additional time delay is applied to the summed output from one section of the array by bulk time delay 18 and the two outputs, one from adder 14 and the other from bulk time delay 18 are multiplied and integrated at 19. The weighting networks 12 and 15, time delay networks 13 and 16, adders 14 and 17, time delay 18 .and multiplier and integrator 19 are common to cross-correlation circuits of this type. If modern digital processing techniques are used then the circuit elements 12 to 14 and 15 to 17 are usually combined into beamformer units. The bulk time delay 18 may be applied to either section of the array, depending upon the direction inn which the beam is to be steered. For example, if the steer direction makes an acute angle to the "right had" section of the array then the bulk time delay is applied to that section.

The following analysis of the array assumes that the array is rectangular and that the section with the greatest number of transducers, that is with the smallest spacing between transducers, only produces one alias beam in each of the "horizontal" and "vertical" directions. The technique described is not so limited in practice. It is also assumed that the analysis is only for the "horizontal" dimension of the array. The terms "horizontal" and "vertical" are relative terms.

Considering the two array sections shown in the Figure, assume that the maximum steering angle from the broadside direction is $\Theta_s$ and the maximum frequency of interest to be $f_{max}$. It is therefore possible to define the maximum acoustic wave number $k_o$ to be $$k_o = 2\pi f_{max}/c \qquad (1)$$

where c is the speed of sound in the medium in which the array is used. The condition that the first section of the array should have only one alias beam is satisfied provided that the first null of the second alias beam is equal to or greater than the maximum acoustic wave number $k_o$. This requires that $$d1 \leq \frac{(2 - \alpha_1/N1) \cdot c}{(1 + \sin\Theta_s) \cdot f_{max}} \qquad (2)$$

where $\alpha_1$ is the beamwidth correction factor for the aperture shading function ($\alpha_1$=1 for uniform shading) and N1 is the number of transducers.

The condition that none of the alias beams of the second section of the array overlaps the alias beam of the first section is given by $$\frac{(2 - \alpha_2/N2)}{(1 + \alpha_1/N1)} \geq \frac{d2}{d1} \geq \frac{(1 + \alpha_2/N2)}{(1 - \alpha_1/N1)} \qquad (3)$$

where N2 and $\alpha_2$ are the number of transducers and the beamwidth correction factor respectively for the second section of the array.

Equation (3) is a general equation to ensure that there is no overlapping between the alias beams of the second section of the array and the alias beam of the first section. It applies equally to horizontal and vertical spacings. It is also valid for curved arrays provided that the radius of curvature is much greater than the wavelength at the maximum frequency of operation. Equation (2) is used only to limit the scope of the problem, that is to ensure that only one alias beam of section 1 of the array can lie within the acoustic region.

As already stated, the reference to the array having two sections may be applied equally to two separate arrays, the difference being only one of convenience.

I claim:

1. A passive sonar transducer arrangement which includes two electronically sterrable array sections arranged with the transducers of one section spaced apart from one another by a different distance from the spacing between the transducers of the other section, the spacing for each section being such that aliasing will occur for at least some steering angles and such that aliasing beams produced by the two sections of the array will not overlap, and cross-correlation means for processing the signals received from the sonar transducers of the two sections such that the effects of the alias beams are substantially removed.

2. An arrangement as claimed in claim 1 in which the spacing of the transducers in one section of the array is such that no more than one alias beam will be produced.

\* \* \* \* \*

UNITED STATES PATENT AND TRADEMARK OFFICE
CERTIFICATE OF CORRECTION

PATENT NO. : 5,504,716
DATED : April 2, 1996
INVENTOR(S) : COTTERILL, Philip

It is certified that error appears in the above-indentified patent and that said Letters Patent is hereby corrected as shown below:

```
Column 1, line 15, change "signalprocessing" to read
--signal processing--;

Column 2, line 10, change λis to read --λ is--;
Column 4,
Claim 1, line 2, change "sterrable" to --steerable--;
Column 4,
Claim 1, line 7, change "aliasing" to read
--the alias--;
```

Signed and Sealed this

Thirtieth Day of July, 1996

Attest:

BRUCE LEHMAN

*Attesting Officer*   *Commissioner of Patents and Trademarks*